Oct. 15, 1963     H. B. SCHULTZ     3,106,874
CONTROL VALVE ACTUATING STRUCTURE
Filed Sept. 8, 1961
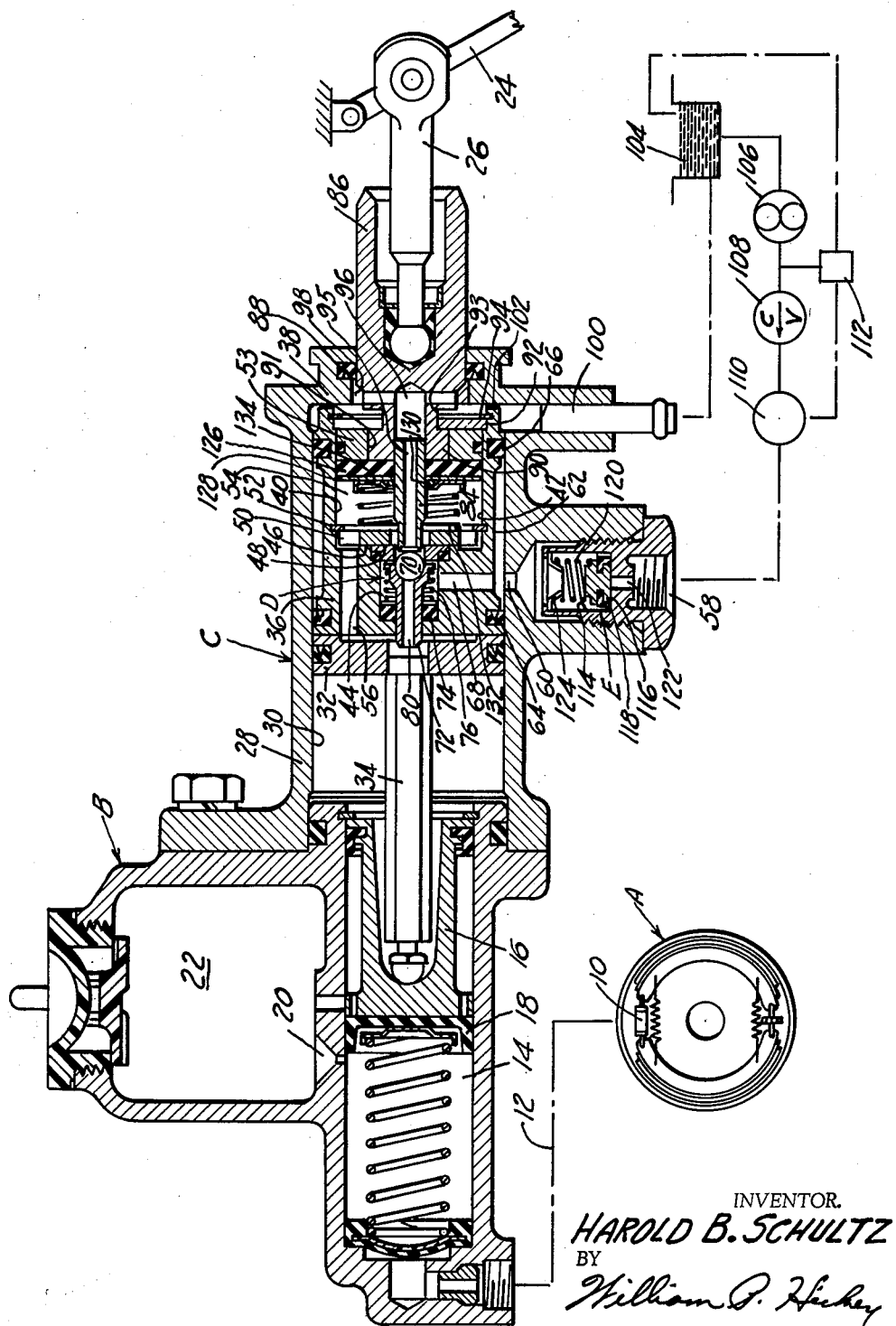
INVENTOR.
HAROLD B. SCHULTZ
BY
William P. Hickey
ATTORNEY

United States Patent Office 3,106,874
Patented Oct. 15, 1963

3,106,874
CONTROL VALVE ACTUATING STRUCTURE
Harold B. Schultz, South Bend, Ind., assignor to The
Bendix Corporation, South Bend, Ind., a corporation
of Delaware
Filed Sept. 8, 1961, Ser. No. 136,921
8 Claims. (Cl. 91—434)

The present invention relates to actuating structure for control valves and more particularly to the actuating structure of the control valves of fluid pressure servomotors.

The conventional master cylinders used to operate the hydraulic braking systems of automotive vehicles conventionally have a hydraulic fluid displacing piston having a stroke of approximately one inch. Where these fluid displacing pistons are actuated manually, the manually actuated force is transmitted through a leverage system having a mechanical advantage of approximately 6 to 1 to necessitate a foot pedal lever movement of approximately six inches. Where the fluid displacement piston is operated by a pneumatic fluid pressure servomotor, the control valve structure for the servomotor is actuated by means of a foot pedal lever having a mechanical advantage of approximately 3 to 1 to necessitate a foot pedal lever movement of approximately three inches. Where the fluid displacement piston of the master cylinder is operated by means of a hydraulic servomotor, a foot pedal leverage system is used to operate the mechanism having a mechanical advantage of approximately 8 to 1 with a three inch pedal movement. The higher mechanical advantage used heretofore with hydraulic servomotor units has been necessary because of the high friction which is produced in the hydraulic seals of the servomotor unit. Hydraulic seals in general produce much greater friction forces than do the type of seals involved in pneumatic control valves; and in both types of units, it is desired that the control valve structures be operated with an initial force which is as low as possible in order that the operator will not be annoyed by a high resistance at the time that the servomotor is brought into operation. Immediately after the servomotor is brought into operation, the master cylinder will be operated by fluid pressure so that the pedal appears to the operator to fall away from his foot.

An object of the present invention is the provision of a new and improved hydraulic servomotor driven master cylinder having a foot pedal lever actuating system having a mechanical advantage approximately that used in a pneumatic power braking system, and which at the same time will not have a bump at the time the servomotor unit is initially actuated.

A more particular object of the present invention is the provision of a new and improved actuating structure to be positioned between a manually operated lever and a control valve; and which will transmit actuating force to the valve with a mechanical advantage greater than one, while at the same time transmitting reaction producing pressures to the mechanically actuated lever in a 1 to 1 ratio.

The invention resides in constructions and combinations and arrangements of parts; and further objects and advantages of the invention will become apparent to those skilled in the art to which it relates from the following description of the preferred embodiment described with reference to the accompanying drawing forming a part of this specification, and in which:

The solitary FIGURE of the drawing is a schematic view of an automotive power braking system in which the servomotor structure is shown in section.

The braking system shown in the drawing generally comprises the usual drum brake structures A, only one of which is shown, each having a wheel cylinder 10 which is supplied with hydraulic pressure from a conventional master cylinder B through the hydraulic lines 12. The master cylinder B includes a fluid pressurizing chamber 14 from which fluid is displaced by means of the conventional hydraulic piston 16 into the hydraulic lines 12 leading to the wheel cylinders 10. The piston 16 is equipped with the usual cup seal 18 which, in its normal retracted position, lies rearwardly of the compensating port 20 which is used to communicate fluid from a make-up reservoir 22 to the fluid pressurizing chamber 14. Upon actuation of the piston 16, the cup seal 18 slides past the compensating port 20 to isolate fluid within the pressurizing chamber and force it out through the hydraulic lines 12. The braking system shown in the drawing further includes a hydraulic pressure operated fluid pressure servomotor C which is controlled by means of the usual foot pedal lever 24 through the interconnecting control rod 26.

The servomotor C shown in the drawing is of the type in which there is no follow-up i.e., no movement of the control rod 26 other than that necessary to operate the unit's control valve D when power is available to actuate the servomotor. The servomotor C shown is formed by means of a cast housing 28 that is suitably bolted to the rear end of the master cylinder B, and includes a longitudinally extending cylinder bore 30 which slidably receives the hydraulic piston 32 which drives the hydraulic piston 16 of the master cylinder through the push rod 34. As previously indicated, the servomotor C is of the no-follow-up type; and in order to provide the no-follow-up feature, the control valve structure D is mounted in another hydraulic piston 36 positioned rearwardly of the piston 32 in the bore 30. Hydraulic piston 36 is normally held in engagement with the rear end wall 38 of the housing 28 by means of the discharge pressure from the control valve structure D which operates the driven piston 32.

The control valve structure D is generally positioned within the stepped bore 40 within the hydraulic piston 36. Stepped bore 40 has a large diameter portion 42 opening rearwardly of the piston 36 and a small diameter portion 44 which extends through the forward end of the piston 36 and which is separated from the large portion 42 by means of a shoulder 46. The sidewalls of the small diameter bore 44 are bored out slightly adjacent the shoulder 46 to receive an annular high pressure valve seat member 48. The valve seat member 48 is provided with a suitable seal, and is held in place by means of a washer 50 which in turn is held against the valve seat member 48 and then against shoulder 46 by means of a snap ring 52. The rear end of the stepped bore 40 is closed off by an annular closure member 53 and the space between the valve seat member 48 and closure member 53 forms the control chamber 54 of the valve whose pressure is communicated with the space between the pistons 32 and 36 by means of suitable openings through the washer 50 and the control passage 56.

Motivating hydraulic pressure fluid is supplied to the pressure inlet connection 58 in a manner later to be explained, and passes through a suitable check valve structure E, also later to be explained, to a pressure port 60 in the sidewalls of the longitudinally extending bore 30. Pressure from the pressure port 60 is continually communicated to the small diameter bore section 44 by means of a reduced diameter center section 62 of the piston 36 which lies between end seals 64 and 66 which effect a sliding seal with respect to the bore 30. Pressure from the annular area provided by the reduced diameter section 62 is communicated to the bore section 44 through a transverse passageway 68 in the piston 36.

Flow out through the high pressure valve seat 50 is controlled by means of a ball valve 70. The ball valve 70 is pressed into the enlarged headed end of a tubular support member 72 which extends out through the front end of the piston 36 and which is sealed with respect to the sidewalls of the small diameter bore section 44 by a suitable seal 74. A suitable coil spring 76 biases the tubular member against the ball 70, and the external diameter of the tubular support member 72 is of the same diameter as is the surface on the valve seat member 48 on which the ball 70 abuts to hydraulically balance the ball 70. The central opening 80 through the tubular member 72 assures that control pressure from the passage 56 will at all times exist on the left side of the ball as seen in the drawing to prevent pressure from removing the ball 70 from the tubular member 84.

Actuation of the control valve D is had by means of a tubular member 84 which extends through the opening in the high pressure valve seat 48 to lift the ball 70 out of engagement with the high pressure seat. Tubular valve actuating member 84 is supported by the front end of the control member 86 to which the front ball end of the control rod 26 is suitably secured. A suitable seal 88 is provided between the external surface of the control member 86 and a receiving opening through the rear end wall 38 of the housing 28; and the reduced diameter front end section 90 of the control member 86 is slidably received in a suitable opening 91 in end closure member 53. Withdrawal of the control member 86 rearwardly out of the unit is prevented by means of a horseshoe washer 92 which is slipped sideways into a groove 93 in the control member 86; and the horseshoe washer 92 is held within the bore 40 by means of a suitable snap ring 94. Sufficient axial play is provided by groove 93 to permit the tubular member 84 to be moved a sufficient amount to abut the ball 70 and move it out of engagement with its valve seat member 48. The groove 93 is so positioned that the tubular member 84 is out of engagement with the ball 70 when the front edge of the groove abuts the horseshoe washer 92. In this position, control chamber 54 is communicated through the central opening 95 of the tubular member to the axial and transverse drillings 96 and 98 in the control member 86 which in turn communicate with the exhaust connection 100 in the rear end of the bore 30. Several grooves 102 are provided in the rear end of the piston 36 to prevent flow restriction around the rear end of the piston 36.

Flow out through the exhaust connection 100 is normally communicated to a sump or reservoir 104 from whence it flows to a high pressure hydraulic pump 106 through a check valve structure 108 to an accumulator 110 which maintains a supply of high pressure fluid under a suitable compressed gas chamber, even when the pump 106 is not pumping. A suitable charging valve 112 is used to unload the pump 106 whenever the pressure in the accumulator 110 exceeds a predetermined upper limit, and causes the pump 106 to charge the accumulator whenever pressure in the accumulator 110 drops below the predetermined limit. Pressure from the accumulator 110 is continually supplied to the pressure inlet connection 58 from whence it flows to the pressure chamber 44 through the check valve structure E.

The check valve structure E may be of any suitable type and as shown in the drawing is formed within the fitting 58 by means of a counterbore 114 in the inner end of the fitting 58. The bottom of the counterbore 114 provides a suitable valve seat 116 against which a poppet member 118 is biased by a coil spring 120 to prevent return flow out through the central opening 122 in the center of the counterbore 114. The spring 120 is held in place by means of a suitable annular flared spring retainer 124 which is fitted into the inner end of the counterbore 114 and is held in place by flaring over the sidewalls of the connector 58.

According to principles of the present invention, the ball valve 70 is actuated by means of a structure which will produce a greater actuating force upon the ball 70 than is supplied to the control member 86. This is accomplished by means of an annular block 126 of elastomeric pressurizable material such as rubber which fits around the tubular member 84 and lies up against the annular closure member 53 and control member 86 to seal off the end of the control chamber 54. The block of pressurizable material 126 is held in place by means of a washer 128 which bears up against a suitable abutment or shoulder 130 carried on the control member 84. Upon forward movement of the control member 86, the block of elastomeric material 126 is pressurized by the abutment of the reduced diameter front end section 90 in much the same manner as is a hydraulic fluid so that the same pressure is distributed over the entire area of the washer 128 which area is larger than that of section 90 to bias the tubular member 84 forwardly with a force which is greater than that exerted upon the control member 86. The tubular member 84 is normally biased rearwardly out of engagement with the ball 70 by means of a coil spring 132 which abuts a retaining washer 134 that is positioned against the forward face of the shoulder 130. Tubular control member 84 is slidingly received within the axial drilling 96 of the control member 86 in order that the necessary relative movement between the control member 86 and tubular member 84 will occur during the pressurizing of the annular body 126.

The actuating structure just described not only produces an actuation of the ball valve 70, but produces a reaction upon the control member 86 which is in a substantially 1 to 1 ratio of the hydraulic pressure which is communicated to the driven piston 32. Hydraulic pressure within the control chamber 54 is exerted against the forward face of the annular block of pressurizable material 126 to bias it into tight sealing engagement with respect to the sidewalls of the bore 40 and with respect to the exterior surface of the tubular control member 84. The pressure which is generated within the annular body 126 is opposed in part by the annular closure member 53 and in part by the front face of the control member 86 so that the amount of reaction which is produced upon the control member 86 is strictly a function of the area of the control member 86 and the control pressure within the control chamber 54. The pressure upon the front face of the control member 86 of course biases it rearwardly to thereby deliver this reaction force up against the foot of the operator on the pedal 24.

In the normal de-energized condition of the system shown in the drawing, the front edge of the groove 90 in the control member 86 is in abutment with the horseshoe washer 93, and the inner end of the tubular member 84 is out of engagement with the ball 70 so that hydraulic pressure under substantially atmospheric pressure exists in the control chamber 54 as well as the area between the pistons 32 and 36. When the pedal 24 is depressed, the front face of the control member 86 is forced into the block of pressurizable material 126 to displace the washer 128 and hence the tubular member 84 forwardly until its front sealing edge abuts the ball valve 70 to thereby isolate the control chamber 54 from the low pressure reservoir 114. Continued inward movement thereafter lifts the ball 70 off of the pressure valve seat 48 to permit pressure from the accumulator 110 to be communicated to the control chamber 54 and thence to the space between the pistons 32 and 36. As pressure fluid is communicated to the space between the pistons, the front piston 32 is forced forwardly to slide the hydraulic piston seal 18 of the master cylinder forwardly over its compensating port 20 to thereby actuate the brakes of the vehicle. Fluid pressure that is communicated against the front piston 32 is also communicated to the front surface of the rear piston 36 to bias it rearwardly and hold it into firm engagement with the rear wall 38 of the servomotor. The only movement of the control member 36 which takes place therefore is that required to actuate the control valve structure D.

During the time that pressure is communicated to the front piston 32 to actuate the brakes of the vehicle, the same pressure is being transmitted against the front face of the body of pressurizable material 126 to bias it rearwardly against the front face of the control member 86 with substantially the same unit pressure. This provides a rearward force to the foot pedal lever 24 which is directly proportional to the force actuating the brakes. When it is desired to prevent further increase in braking effort, constant force is maintained upon the pedal 24 which permits sufficient pressure to build-up past the ball 70 into the control chamber 54 to produce a reaction force on the control member 86 which equals and offsets the force being supplied to the foot pedal lever 24 by the operation. This biases the control member 86 rearwardly by a sufficient amount to allow the ball 70 to abut the valve seat 48 and thereby prevent any further build-up in the brake actuating pressure.

A reduction in braking effort is accomplished by removing some force from the lever 24 whereupon the internal pressure of the pressurizable disk 126 causes the control member 86 to move rearwardly, and in turn permit the washer 128 to move rearwardly, by an amount which allows the tubular member 84 to move out of engagement with the ball 70. This permits pressure to be bled out of the control chamber 54 through the passages 94, 96 and 98 to the exhaust connection 100. This continues until the pressure in the control chamber 54 decreases by an amount which permits the force on the pedal lever 24 to cause the tubular member 84 to again abut the ball 70, and thereby prevent further flow of pressure fluid out of the control chamber 54. A complete removal of force from the pedal lever 24 permits the block of pressurizable material 126 to move the tubular control member 84 to the position shown in the drawing, wherein all pressure is removed from the control chamber 54.

Upon failure of the hydraulic pump 106, the braking system can be operated manually by depressing the foot pedal lever 24 to cause the rear shoulder of the groove 90 in the control member 86 to abut the horseshoe washer 93 and thereby drive the rear piston 36 forwardly into abutment with the front piston 32. This of course moves the front piston 32 forwardly in the same manner previously described to operate the hydraulic displacement piston 16 of the master cylinder B. The check valve structure E serves the same purpose as described in my copending application Serial No. 135,489, now Patent No. 3,074,383 and for a more complete understanding of its construction and operation reference may be had to that application.

It will be apparent that the objects heretofore enumerated as well as others will have been accomplished; and that there has been provided an actuating mechanism for a control valve structure and the like which produces an actuating force in one direction with a considerable mechanical advantage, while at the same time producing a reaction force in the opposite direction in an amount which is a 1 to 1 ratio of the delivered fluid pressure.

While the invention has been described in considerable detail, I do not wish to be limited to particular embodiment shown and described, and it is my intention to cover hereby all novel adaptations, modifications and arrangements thereof which come within the practice of those skilled in the art to which the invention relates.

I claim:

1. In a fluid pressure control valve: a body member having a forwardly and rearwardly extending fluid pressure chamber therein of predetermined cross section, said chamber having a rear end wall, said rear end wall having an opening therein whose cross sectional area is smaller than that of said chamber, a control member slidably received in said opening, said control member having a front end section of a preselected diameter, a control pin slidably received by said control member and projecting into said chamber, an annular body of pressurizable elastomeric material positioned against said rear end wall and surrounding said control pin, an annular rigid washer surrounding said pin forwardly of said annular body, said washer being in abutment with said annular body on a surface of greater diameter than said front end section, abutment means preventing forward movement of said washer relative to said pin, and a control valve structure operated by said pin, said control valve structure increasing the pressure in said chamber against said annular body of pressurizable material upon forward motion of said pin, whereby said control valve structure is operated by a force greater than that exerted on said control member.

2. In a fluid pressure control valve: a body member having a forwardly and rearwardly extending fluid pressure chamber therein of predetermined cross section, said chamber having a rear end wall, said rear end wall having an opening therein whose cross sectional area is smaller than that of said chamber; a control member slidably received in said opening, said control member having a front end section with a longitudinally extending bore opening into said chamber adjacent said rear end wall, a control pin slidably received in said bore and projecting into said chamber through said rear end wall, an annular body of pressurizable elastomeric material positioned against said rear end wall and surrounding said control pin to effect a seal therewith, said annular body being of substantially the same cross section as said chamber, an annular rigid washer surrounding said pin forwardly of said annular body in abutment therewith, said washer being of a larger cross sectional diameter than said front end section, abutment means preventing forward movement of said washer relative to said pin, a control valve structure operated by said pin, said control valve structure increasing the pressure in said chamber against said annular body of pressurizable material upon forward motion of said pin; and a spring biasing said control pin rearwardly to hold said pin in said bore and said annular body in sealing engagement with said rear end wall, whereby said control valve structure is operated by a force greater than that exerted on said control member.

3. In a fluid pressure control valve: a body member having a forwardly and rearwardly axially extending internal fluid pressure chamber of predetermined diameters therein with front and rear end walls, an axially extending valve port in said front end wall; a forwardly facing valve seat in said valve port, a poppet member for abutment with said valve seat, an axially extending opening in said rear end wall, said opening having a smaller diameter than said rear chamber diameter, a control member slidably received in said opening with a face which is normally coextensive with said rear end wall, said control member having an axially extending opening therein communicating through said face with said chamber, an axially extending tubular control pin slidably received in said opening in said control member and projecting forwardly for sealing abutment with said poppet member, an annular body of pressurizable elastomeric material of substantially the same diameter as said rear chamber, said body being positioned against said rear end wall and sealingly engaging said control pin, an annular rigid washer of equal diameter as said body surrounding said pin forwardly of said annular body in abutment with the entire face of said body opposite that in contact with said rear end wall and said face of said control member, abutment means preventing forward movement of said washer relative to said pin, means for exhausting fluid out of said opening in said control member, and means controlled by said poppet for communicating pressure to said chamber when moved forwardly by said tubular control pin, whereby said poppet member is moved forwardly by a force greater than exerted on said control member.

4. A servomotor comprising: a body member having a forwardly and rearwardly axially extending chamber therein; forwardly and rearwardly positioned movable walls in said chamber forming an expansible chamber therebetween, means preventing said rearwardly positioned movable wall from moving rearwardly out of said chamber, said rearwardly positioned movable wall having an internal pressure chamber with front and rear end walls of predetermined area, an axially extending valve port in said front end wall for communicating pressure to said internal chamber of said rearwardly positioned movable wall, a forwardly facing valve seat in said port, a poppet member for abutment with said valve seat, said rear end wall having an axially extending opening therein, a control member of lesser area than said rear end wall slidably received in said opening, said control member having an axially extending opening therein communicating with said chamber, an axially extending tubular control pin slidably received in said opening in said control member and projecting forwardly for sealing engagement with said poppet member, an annular body of pressurizable elastomeric material having front and rear faces of equal area as said rear end wall with said rear face positioned against said rear end wall and sealingly engaging said control pin, an annular rigid washer of equal area as said front face surrounding said pin forwardly of said annular body, abutment means operatively connected to said control pin preventing forward movement of said washer relative to said control pin, spring means to bias said abutment means against said washer, said washer against said body and said body against said rear end wall, means for exhausting fluid from said internal opening of said control member, and means communicating said internal chamber of said rearwardly positioned movable wall to said expansible chamber between said movable walls, whereby said poppet member is moved forwardly by a force greater than that applied to said control member to actuate said servomotor and said control member is biased rearwardly by the same pressure force used to drive said forwardly positioned movable wall.

5. In a fluid pressure control valve:
a body member having a forwardly and rearwardly extending fluid pressure chamber having a fixed diameter to provide a predetermined cross sectional area, said chamber having a rear end wall, said rear end wall having an opening therein, which opening is of lesser diameter than said chamber;
a control member slidably received in said opening, said control member having a front end section extending through said opening to lie flush with said rear end wall of said chamber;
a control pin adapted to move relative to said control member, said pin projecting into said chamber;
an elastomeric member having a diameter substantially equal to that of said chamber, said elastomeric member arranged to abut said front end section and said rear end wall of said chamber;
means to operatively connect said elastomeric member and said control pin, which means includes a washer in abutment with the whole surface of said elastomeric member, such that pressure applied by the control member acts upon said elastomeric member on a surface of smaller diameter than said washer diameter; and
a control valve structure operated by said pin.

6. In a fluid pressure control valve according to claim 5 wherein said control valve structure comprises: a valve seat; a ball valve; and a support member, which support member is adapted to bias said ball valve against said valve seat to create a valve seat contact area, which area is equal to an external diameter of said support member.

7. In a fluid pressure control valve according to claim 6 wherein said support member is provided with a passage.

8. In a fluid pressure device according to claim 1 wherein said control valve structure comprises: a valve seat; a ball valve; and a support member, which support member is adapted to bias said ball valve against said valve seat on a diameter proportional to the cross section of said support member such that a predetermined ratio is maintained between valve opening and closure forces.

References Cited in the file of this patent
UNITED STATES PATENTS

| | | |
|---|---|---|
| 2,745,383 | Hupp | May 15, 1956 |
| 2,997,028 | Ayers | Aug. 22, 1961 |
| 3,016,881 | Wilkens et al. | Jan. 16, 1962 |
| 3,035,551 | Rike | May 22, 1962 |